Dec. 31, 1946.  W. BUCHELE  2,413,286

LENS

Filed March 3, 1943

WITNESSES

INVENTOR
William Buchele
BY
ATTORNEYS

Patented Dec. 31, 1946

2,413,286

UNITED STATES PATENT OFFICE 2,413,286

LENS

William Buchele, Toledo, Ohio

Application March 3, 1943, Serial No. 477,798

2 Claims. (Cl. 88—32)

This invention relates to lens construction and more particularly to a lens construction adapted for use in binoculars and similar instruments.

An object of the invention is to provide a construction in which the secondary mirror will be supported in a more efficient manner than in the construction now in use.

In this optical system it is usual to support the secondary by means of a mechanical support which of necessity constitutes more or less of an impediment in the light path and obstructs to some extent the surface of the reflecting mirror.

An object of this invention is to provide a construction which will eliminate the mechanical support and which will reduce the cost of construction.

In the accompanying drawing.

Figure 1:
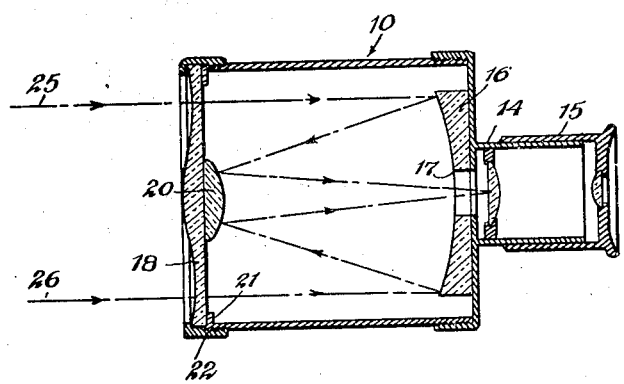
Figure 1 is an enlarged cross sectional view of a binocular embodying my improved construction.
Figure 2:
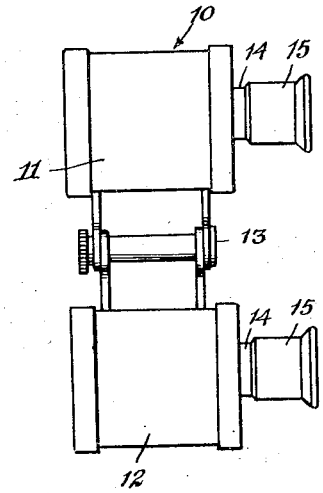
Figure 2 is a plan view of the complete binocular.

The binocular 10 consists of two members 11 and 12 hinged together at 13. Each member is provided with a conventional eyepiece 14 having adjustable section 15.

Within the binoculars, I provide a conventional spherical mirror 16 having an opening 17 therein leading to the eyepiece. I also provide the usual primary lens or correcting plate 18. I then cement to the back of the correcting plate 18 a secondary mirror 20 thus eliminating the need for a mechanical support since the correcting plate 18 is itself supported by the flange 21 and the rim 22. It will be noted that the light rays indicated by the lines 25 and 26 will pass through the correcting plate and be reflected by the spherical mirror 16 to the secondary mirror 20, through the opening 17 into the eyepiece 14. My construction not only reduces the cost but also eliminates mechanical construction usually present to support the secondary 20.

I claim:

1. In an optical system for a binocular having a pair of conventional eye pieces, a concavo-spherical mirror with an opening therein leading to each said eye piece, a correcting plate and a convex mirror cemented to the center of said correcting plate opposite each said spherical mirror, said convex mirror facing said spherical mirror.

2. In an optical system for a binocular having a pair of conventional eye pieces, a concavo-spherical mirror with an opening therein leading to each said eyepiece, a correcting plate and a convex mirror affixed to the center of said correcting plate opposite each said spherical mirror, said convex mirror facing said spherical mirror.

WILLIAM BUCHELE.